Patented June 12, 1945

2,377,854

UNITED STATES PATENT OFFICE 2,377,854

ARTIFICIAL FIBERS AND MANUFACTURE THEREOF

Robert A. Boyer, Dearborn, and William T. Atkinson and Charles F. Robinette, Detroit, Mich., assignors to Ford Motor Company, Dearborn, Mich., a corporation of Delaware No Drawing. Application June 7, 1941, Serial No. 397,076

3 Claims. (Cl. 106—154)

An object of this invention is to obtain solutions from which artificial fibers may be spun, as with a spinnerette.

Another object of this invention is the formation of solutions or colloidal dispersions of proteins or like materials with a suitable solvent or mixture of solvents.

Another object of this invention is the formation of protein spinning solutions having high protein content, cohesive and stringy body, good stability, and substantially high velocity.

We propose to use this invention in the spinning of artificial fibers from protein and like materials. In this process, the proteins are dissolved by a suitable solvent. Such a solution may be stored or may be immediately forced through a multiple hole spinnerette submerged in a coagulating bath. As the solution jets from each hole of the spinnerette, it is instantaneously precipitated to form an artificial fiber strand. These strands are gathered together, stretched, treated, dried, and processed to form yarn or thread.

It will be readily understood that the protein solution is a highly complicated and important element in the process and that the solvents to be used must be carefully chosen. In this connection, proteins form colloidal dispersions rather than true solutions; the latter is the term generally used in this art and will be used here. However, these colloidal dispersions are not gels but have the physical characteristics of true solutions.

A desirable spinning solution is one which has a relatively high protein content, high viscosity, a cohesive and somewhat "stringy" quality, and good stability. Such solution can only be made from a well balanced formula employing a suitable solvent; particularly, the pectic or gelling action of the protein must be overcome and stabilized.

If in the usual formula the protein content is raised by adding protein, a gel forms, and the resultant mixture is usually unspinnable and worthless. A mere increase in protein concentration is, therefore, not enough. Nor does an increase in the ordinary solvent concentration give better results, for while the protein content may be increased without gelling, the solution is very unstable and degenerates rapidly. Such degeneration and instability lower the viscosity and render the solution worthless.

Although some slight gels may be spun with difficulty, the resultant fibers are not of the best. The problem, therefore, is to obtain a solution that is stable, of high protein content, and of spinnable viscosity, while avoiding a gel or a solution of doubtful stability.

It has been found that proteins, even successive batches of the same type, will vary slightly in their requirements of water and solvents for producing solutions of desired viscosity. Solubilities of various batches of protein, like viscosities, are largely dependent on the extraction formula and technique. Hydrolysis, denaturation and degradation influence solubilities to such an extent that one batch of protein forms solutions that may contain as much as 10 per cent more protein for comparable viscosity than other batches of like protein. In order to apply any given formula for spinning solutions, proteins of successive batches should be carefully controlled and correlated to the preceding batches. If care and control are exercised, desired viscosity and stability of solution are easily attained.

An essential element in our solution is the presence of a product that is produced by the reaction and subsequent aging of a base, an alcohol, and carbon disulphide. Of course, carbon disulphide is well-known for its solvent properties but we do not employ it as a solvent but rather utilize its chemical action with other substances to form a product whose chemical properties are most useful in making artificial fiber spinning solutions. Thus, if ethyl alcohol, sodium hydroxide and carbon disulphide are reacted, a xanthate is formed. This xanthate, properly treated, may be used in protein spinning solutions and imparts thereto all the desirable characteristics required.

Generally, the xanthate is produced by the reaction of either the simple or polyhydroxy alcohols with carbon disulphide and an alkali metal hydroxide. However, xanthates in aqueous solution tend to degrade into sulphides and carbonates. This action is complex and is not fully understood at present; but it is clearly apparent that there is a further change in the xanthate. Thus, freshly prepared xanthate will not improve the spinning solution noticeably. But, if the xanthate is allowed to age for from ten to thirty days, the effect is entirely different. It is this aged reaction product which we incorporate in the protein solution and but minute quantities need be present.

As a specific example, a sodium ethylate and carbon disulphide reaction product provides the proper reactions with protein and other simple solvents to produce a superior solution that is stable and that has high viscosity and high protein content. Such a product may be made in the laboratory and incorporated into the solvent as follows: One ml. of ethyl alcohol is reacted to completeness with ten ml. of 1.3 sp. gr. sodium hydroxide, forming sodium ethylate in excess of sodium hydroxide. To this mixture one ml. of carbon disulphide is added and allowed to react to completeness to form sodium ethyl xanthate, a compound of yellow-orange color. This is permitted to age for 15 days. Aliquot parts of this aged sodium ethyl product in excess of sodium hydroxide, hereinafter known as solvent "G," are utilized in conjunction with 1.3 sp. gr. sodium hydroxide to form the solvent for protein.

The following formula employs solvent "G" to produce excellent protein solution having a protein content of approximately 18 percent that can be spun to form an artificial fiber resembling wool and that has a viscosity of 5,760 poises by Brookfield Synchro-lectric viscosimeter:

*Formula "A"*

| | | |
|---|---|---|
| Soy protein | grams | 90 |
| Water | ml | 350 |
| NaOH (1.3 sp. gr.) | ml | 15 |
| Solvent "G" | ml | 3 |
| Water | ml | 30 |

In preparing the preceding solution for spinning purposes, steps must be taken to prevent any lumps or undissolved portion to reach the final solution. All undissolved portions are detrimental and cause difficulties in the spinning process and, therefore, extreme care in technique must be exercised to prevent these troubles. The aging period required may be reduced by the application of heat, but room temperature aging gives a superior product.

If finely ground protein is used, greater care must be exercised to prevent lumps because finely ground flour-like materials tend to form balls or pellets when moistened and these pellets have dry centers. When the solvent is added to such balls or pellets in an aqueous slurry, the dry centers do not readily go into solution. In formula "A," therefore, the dry protein is placed in a suitable mechanical mixer having one or more blades. A portion of the 350 ml. of water is added to form a thick paste; this mixture is then stirred until all lumps or particles are thoroughly wetted and disintegrated. To this paste the remainder of the 350 ml. of water is added and allowed to penetrate for several minutes. After such time the stirrer is stopped and the entrapped air in the diluted mixture is allowed to rise to the surface in the form of a froth that is skimmed off and discarded.

The stirrer is again started at a slower speed so that air will not again be entrapped. The remainder of the formula, the diluted solvent:

| | Ml. |
|---|---|
| NaOH (1.3 sp. gr.) | 15 |
| Solvent "G" | 3 |
| Water | 30 | is added, forming almost instantaneously a very viscous, dark green solution. This solution is stirred for ½ hour to 2 hours at a speed that does not tend to entrap air until all particles are homogeneously dispersed.

When the water and protein are first mixed, there is no color change. The protein softens and swells slightly with the absorption of water, but remains in a granular stage. With the addition of the solvent mixture, however, the color changes instantaneously and the change from granular, particle stage to a thick plastic amorphous stage is also instantaneous. The mixing of protein solution does not require heat; therefore, solutions are usually made at room temperature that ordinarily is approximately 22° to 28° C.

After the dispersion has been completed, there need not be a ripening or maturing period such as is usually required in spinning solutions. The solution, if immediate spinning is not desired, may be stored for approximately eight days under ideal conditions. Such conditions refer to controlled temperature of 21° C or less. The viscosity of such stored protein solution decreases with each succeeding day; but even at the end of eight days, the viscosity is still such as to give a spinnable solution. The protein spinning solution thins without putrefaction or degradation and retains the stringiness characteristic of a spinnable solution.

Other solutions not containing our product in their solvents would be gels, paste-like substances or degraded watery solutions at the end of such long storage period. Our solvents give the protein spinning solution the desirable stability that could not previously be attained with other alkaline solvents.

The importance of our product in a protein solution is shown in the following formula. If the $CS_2$ of solvent "G" is left out of Formula "A," more water, as in Formula "B," must be added to obtain comparable viscosities.

*Formula "B"*

| | | |
|---|---|---|
| Soy protein | grams | 90 |
| Water | ml | 465 |
| NaOH (1.3 sp. gr.) | ml | 15 |
| Solvent "G" (minus $CS_2$) | ml | 3 |
| Water | ml | 30 |

But the protein content of this solution is only approximately 15 per cent, as compared to 18 per cent for Formula "A."

It will be noticed that the removal of the minute amount of $CS_2$ that is contained in 3 ml. of solvent "G" requires an additional 115 ml. of water to lower the viscosity to that attained by the use of $CS_2$ in our product in the preceding formula. Due to the lack of this product in Formula "B," the protein content was lowered approximately 3.5 percent and the solution of Formula "B" is not as stable as a solution made by Formula "A." The color of solution "B" is amber or light brown, whereas our solvent of Formula "A" reacted with the protein to form a deep green color. The amount of solvent "G" may be increased to approximately 9 ml. or decreased to 2 ml. when varying spinning characteristics are desired.

Moreover, if the $CS_2$, that was removed from solvent "G" is added as $CS_2$ to Formula "B," there is no apparent reaction. The $CS_2$ appears not to have reacted, since the viscosity remains the same and there is no color change as in the use of our solvent.

The use of additional amounts of solvent "G" may raise the protein content to approximately 25 per cent with the elimination of water. Such solutions may not be as stable as solutions of Formula "A."

Since hydrolysis, denaturation and degradation influence the solubilities of protein, such solubilities are dependent on the extraction formula and technique. The solubilities of protein from the same source may vary by 10 per cent. Therefore, several proteins from the same source may require different formulae.

Protein fibers have been spun from the foregoing spinning solution into precipitating acid baths, treated in salt baths and dried. Such resultant fibers were soft, pliant and strong and they have been incorporated with wool to form fabrics that have been used in clothing and upholstery materials.

Precipitating and treating baths may be made according to the following formulae:

*Precipitating bath*

| | Percent |
|---|---|
| $H_2SO_4$ | 2 |
| $Al_2(SO_4)_3$ | 18 |
| NaCl | 12 |
| $H_2O$ | 68 |

*Treating baths*

| | Percent |
|---|---|
| NaCl | 12 |
| $Al_2(SO_4)_3$ | 1 |
| $H_2O$ | 87 | or

| | Percent |
|---|---|
| NaCl | 12 |
| $Al_2(SO_4)_3$ | 1 |
| HCHO | 9.1 |
| $H_2O$ | 77.9 |

We have thus evolved a spinning solution particularly designed to be used in the production of artificial fibers that embodies the desirable characteristics of a high protein content, suitable viscosity for spinning and workable stability. We find that by the use of this solution, artificial fibers of excellent quality may be spun and a fibrous material obtained that closely resembles wool. Such solutions are made from protein base such as is found in the soy bean.

Some changes or modifications may be made in the methods or steps thereof comprising our invention without departing from the spirit of our invention, and it is our intention to cover by our claims such changes as may be reasonably included within the scope thereof.

We claim:

1. A composition of matter, an aqueous soy protein spinning solution comprising the reaction product of:

| | | |
|---|---|---|
| Soy protein (substantially pure) | gm | 90 |
| NaOH (1.3 sp. gr.) | ml | 15 |
| $H_2O$ | ml | 350 to 400 |
| Xanthate | ml | 3 | said xanthate comprising the reaction product of 1 ml. carbon disulphide and the product of 10 ml. sodium hydroxide and 1 ml. ethyl alcohol and having been aged substantially 10 days at room temperature.

2. A composition of matter, an aqueous soy protein spinning solution comprising the reaction of:

| | Percent |
|---|---|
| Soy protein (substantially pure) | 15 –25 |
| Alkali metal hydroxide | .5 – 1.5 |
| Xanthate | .05– .3 |

Remainder being water, said xanthate comprising a reaction product of carbon disulphide and the product of sodium hydroxide and ethyl alcohol and having been aged substantially ten days at room temperature.

3. A composition of matter, an aqueous soy protein spinning solution comprising the reaction of:

| | Percent |
|---|---|
| Soy protein (substantially pure) | 15 –25 |
| Alkali metal hydroxide | .5 – 1.5 |
| Xanthate reaction product | .05– .3 |

Remainder being water, said xanthate comprising a reaction product of carbon disulphide and the product of an alkali metal hydroxide and ethyl alcohol and having been aged substantially 10 days at room temperature to a degraded product comprising alkali metal sulphide and alkali metal carbonate.

ROBERT A. BOYER.
CHARLES F. ROBINETTE.
WILLIAM T. ATKINSON.